Dec. 31, 1946. H. LIEBERHERR 2,413,359
COMBUSTION CHAMBER FOR INTERNAL-COMBUSTION ENGINES
Filed May 5, 1945 2 Sheets-Sheet 1
Fig. 1.
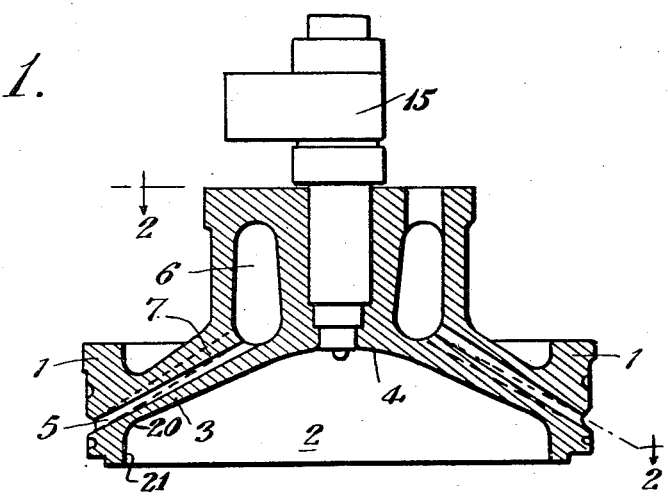
Fig. 2.
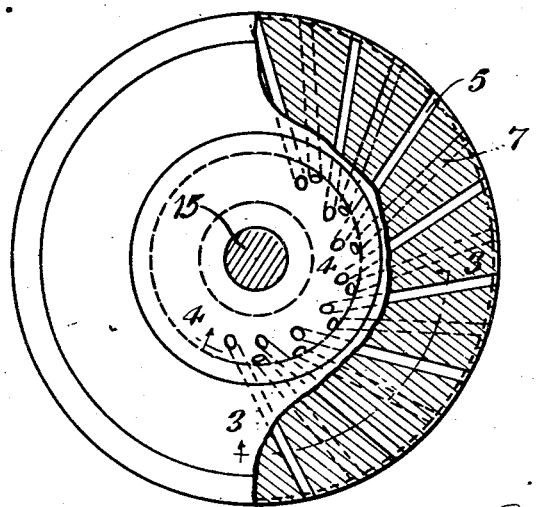
Fig. 3.
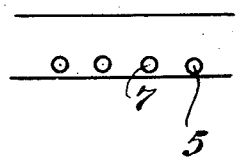
Fig. 4.
INVENTOR
Hans Lieberherr
BY
Pennie, Davis, Marvin & Edmonds
ATTORNEYS Dec. 31, 1946. H. LIEBERHERR 2,413,359
COMBUSTION CHAMBER FOR INTERNAL-COMBUSTION ENGINES
Filed May 5, 1945 2 Sheets-Sheet 2

INVENTOR
Hans Lieberherr
BY
Pennie, Davis, Marvin & Edmonds
ATTORNEYS

Patented Dec. 31, 1946

2,413,359

UNITED STATES PATENT OFFICE 2,413,359

COMBUSTION CHAMBER FOR INTERNAL-COMBUSTION ENGINES

Hans Lieberherr, Winterthur, Switzerland, assignor to Sulzer Freres, Societe Anonyme, Winterthur, Switzerland Application May 5, 1945, Serial No. 592,231
In Switzerland May 8, 1944

9 Claims. (Cl. 123—173)

One of the limits for the construction of internal combustion engines up to the present has been set by the high thermal stressing of the walls of the combustion chamber. The higher the load on the engine and the greater the cylinder diameter, the more are cracks due to heat to be expected. The counteracting of these heat stresses is of particular importance in the two-stroke, and especially in the supercharged two-stroke engine.

The purpose of the invention is to design the combustion chamber in such a way that injurious heat stresses can no longer occur.

It consists primarily in the employment of a combustion chamber whose boundary at the head end is formed in the main by a surface sloped hyperbolically or conically, while the part in the neighborhood of the centre of the head is made, in the main, plane. By this means the end is attained that in the outer part the cooling-medium can be conducted through passages which run quite close to the contour boundary of the combustion chamber. In the central part, on the other hand, a collecting space is created for the cooling-medium leaving the passages. If the passages are radially arranged, they conform to a contour boundary describing a cone, while if they are arranged at any given angle to the radius, the result is a section of a certain hyperboloid of rotation.

An arrangement of this kind itself has considerable advantages, but is still imperfect, since the cooling changes with the radius on account of the greater distance between the passages towards the outside than towards the inside and in some circumstances becomes insufficient towards the outside. It is therefore further proposed to use two or more rows of passages in such a way that at least one of the two rows is more acutely inclined than the other with respect to the longitudinal axis of the head, but always in such a way that lines connecting the axes of the passages form approximately isosceles triangles in any cylindrical section through the head parallel to its axis. This arrangement permits the cooling effect per unit area of the cylinder head to be kept approximately equal over the whole surface.

Two embodiments of the invention are shown diagrammatically in the drawings.

Fig. 1 is a sectional view of a cylinder head of a two-stroke internal combustion engine, Fig. 2 the plan on the section 2—2 of Fig. 1, Fig. 3 is a cylindrical section along the line 3—3 of Fig. 2, Fig. 4 a cylindrical section along the line 4—4 of Fig. 2.

Figure 5:
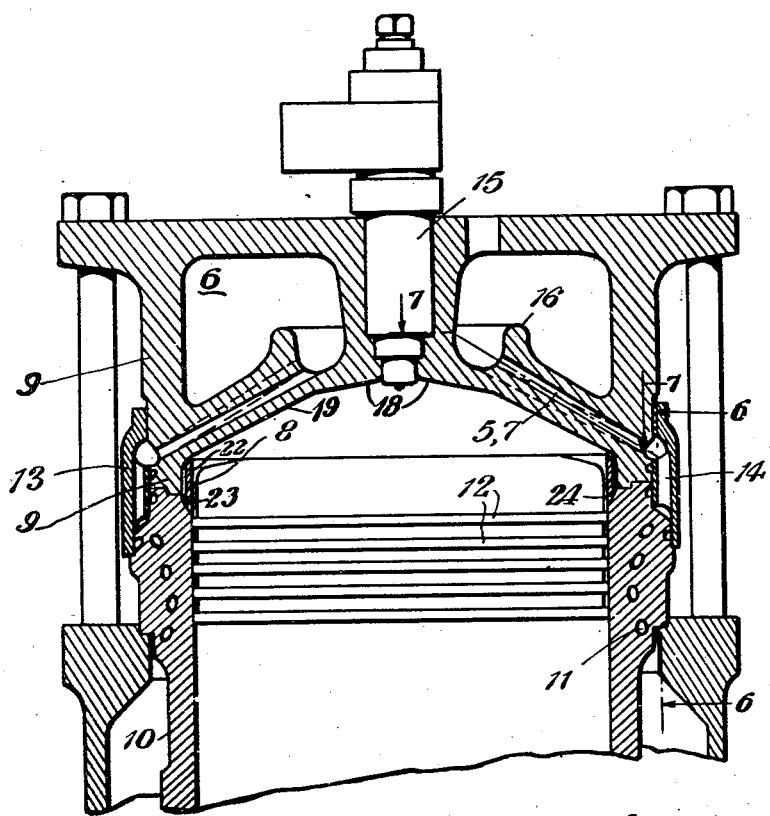
Fig. 5 is a sectional view of a modified form of cylinder head together with the end portion of a connected cylinder assembly.

In Fig. 1 is shown the cylinder head 1, whose boundary 2 on the side of the gases is, principally and towards the outside, a surface 3 sloping downward which is in the main a hyperboloid of revolution and is, towards the inside, an approximately flat surface 4. The principal surface 3 merges through a sharply curved portion 20 with a substantially cylindrical portion 21 which is to abut the cylinder assembly. The head 1 is further provided with a collecting space 6, into which the cooling medium enters through the cooling passages 5, 7. The cooling passages 5, 7 are arranged in two different rows inclined at an angle to the head axis, the cooling passages 7, for instance, being inclined at a more acute angle than the cooling passages 5.

In Fig. 2 the centre lines of the cooling passages are arranged at a certain angle to the radius and therefore describe a section of hyperboloid or rotation.

On the plane of the section 3—3 in Fig. 2 the cooling passages 5, 7 lie, as Fig. 3 shows, alongside each other. In Fig. 4 it is shown that the connecting lines of the axes of the cooling passages in the cylinder section 4—4 form approximately isosceles triangles 5—7—5. The end is thus achieved that the cooling per unit area of the cylinder cover is kept approximately equal over the whole surface.

In the embodiment of the invention illustrated in Fig. 5, the cylinder head 9 has an inner arched, but conical, boundary surface 17 which has, preferably, an inner substantially flat portion 18 and surrounding that a much larger, more abruptly sloping, conical portion 19. This principal surface 19 merges through a sharply curved portion 22 with a substantially cylindrical portion 23 and abuts the recessed portion 24 of the cylinder liner 10.

The part of the cylinder liner 10 adjacent to the head 9 in Fig. 5 also belongs to the combustion chamber. Between the liner 10 and the head 9 an inner protective ring 8 is provided against heat, in order to keep the surface temperature low even at the places further removed from the cooling passages. It is expedient to equip the liner 10 also with cooling passages 11, this being done in such a way that the passages reach the point at which they lie nearest to the liner surface as far as possible in the region of the upper piston rings 12.

In order to prevent any great drop of temperature presenting itself in the parts of liner and piston lying above this point, this part of the combustion chamber is protected from direct contact with the atmosphere or the coolant and from consequent radiation of the heat of combustion by the provision of an outer protective ring 13. It is expedient in order to avoid any leakage between the liner 10 and the cylinder head 9, to provide the ring 13 with passages 14 and sealing means in such a way that coolant can in no case reach the sealing surface between the liner and the head.

In the design in Fig. 5 the lower and upper boundaries of the collecting space 6 are formed by continuous walls. The danger of a weakening of the head at the points where the cooling passages open is obviated by the provision of a strengthening ridge 16.

Figure 6:
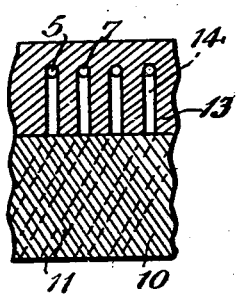
Fig. 6 is a cylindrical section along the line 6—6 of Fig. 5.

In Fig. 6 the cylinder liner 10 and ring 13 are shown in section, illustrating how the cooling passages 11 are connected to the cooling medium passages 5, 7 in the cylinder head 9 by the passage 14.

Figure 7:
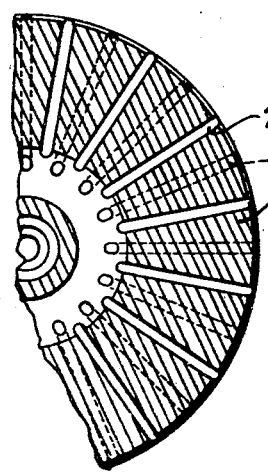
Fig. 7 is a partial section on the line 7—7 of Fig. 5.

When the inner surface of the head 9 is composed of surfaces of circular cones, as shown in Fig. 5, instead of a surface of a hyperboloid of revolution as shown in Fig. 1, the slope cooling passages 5—7 are preferably arranged radially around the longitudinal axis of the head as a center, as shown in Fig. 7.

In the head starting and safety valves may also be provided in appropriate fashion as well as fuel valve 15, which alone is shown.

I claim:

1. The improvement in internal combustion engines which comprises a cylinder head and cylinder, the inner surface of said head having an arched configuration, the major portion of said surface consisting of a single surface of revolution sloping from the center down to the outside where said inner surface coincides with said cylinder, a relatively large number of holes of relatively small diameter in the sloping part of said head close to said inner surface and arranged to conform thereto forming passages for the flow of a cooling fluid and a collecting space for said head to which the inner ends of said passages are connected.

2. The improvement according to claim 1 in which a central portion of the inner surface is approximately flat and the major portion, contiguous thereto, is conical and merges with an abruptly curved part where said inner surface coincides with the cylinder.

3. The improvement according to claim 1 in which a central portion of the inner surface is approximately flat and the major portion, contiguous thereto, is hyperbolic and merges with an abruptly curved part where said inner surface coincides with said cylinder.

4. The improvement according to claim 1 in which a reinforcing ridge integral with the head surrounds the inner ends of the passages and projects upward into the collecting space which is inside the head.

5. The improvement according to claim 1 in which the cooling passages formed in the head comprise two rows, one row being exterior of the other and the passages of each row being at different acute angles with respect to the longitudinal axis of the cylinder for the head, the center lines of the passages when shown in cylindrical section forming the vertices of isosceles triangles.

6. The improvement in internal combustion engines which comprises a cylinder head and cylinder assembly, said head comprising an inner surface having an arched configuration, the major portion of said surface consisting of a single surface of revolution sloping downward from the center to the outside where said inner surface coincides with said cylinder assembly, a relatively large number of holes of relatively small diameter in the sloping part of said head close to said inner surface and arranged to conform thereto forming passages for the flow of a cooling fluid and a collecting space for said head to which the inner ends of said passages are connected, and said cylinder assembly comprising a cylinder liner to which the head is connected, an annular recess in the liner near its connection with the head, and a heat-protective ring mounted in the recess to retard heat absorption adjacent said connection.

7. The improvement in internal combustion engines which comprises a cylinder head and cylinder assembly, said head comprising an inner surface having an arched configuration, the major portion of said surface consisting of a single surface of revolution sloping downward from the center to the outside where said inner surface coincides with said cylinder assembly, a relatively large number of holes of relatively small diameter in the sloping part of said head close to said inner surface and arranged to conform thereto forming passages for the flow of a cooling fluid and a collecting space for said head to which the inner ends of said passages are connected and said cylinder assembly comprising a cylinder liner to which the head is connected, a plurality of passages in the liner located in an annular area exterior of that portion of the liner surface which is swept by the piston rings and adjacent the head, and means providing an interconnecting passageway for the flow of cooling fluid from the passages in the liner to the passages in the head.

8. The improvement according to claim 7 in which the means forming the interconnecting passageway is a ring having a plurality of passages each of which is in coincident engagement with a passage in the liner and in the head.

9. The improvement in internal combustion engines which comprises a cylinder head, a cylinder liner connected to the head, an opening in the center of the head for mounting a fuel valve, an annular collecting space in the head which surrounds the opening, the inner surface of the head having an arched configuration with a minor portion near the opening fairly flat, the minor portion being contiguous with a major portion that slopes downward away from the longitudinal axis of the liner, the major portion consisting of a single surface of revolution and merging with an abruptly curved surface that becomes cylindrical where the head joins the liner, a plurality of passages in the head and exterior of the major portion of the inner surface which enter the collecting space, a plurality of passages in the liner arranged exterior to that portion of the liner which is adjacent to the head and swept by the rings of the piston, ring means mounted outside the liner providing an interconnecting passage means from the passages in the liner to the passages in the head, and a heat-protective ring in the liner to retard heat absorption where the liner engages the head.

HANS LIEBERHERR.